Dec. 27, 1960 V. HAENSEL ET AL 2,966,529
PROCESS FOR THE PRODUCTION OF AROMATIC HYDROCARBONS
Filed April 28, 1958
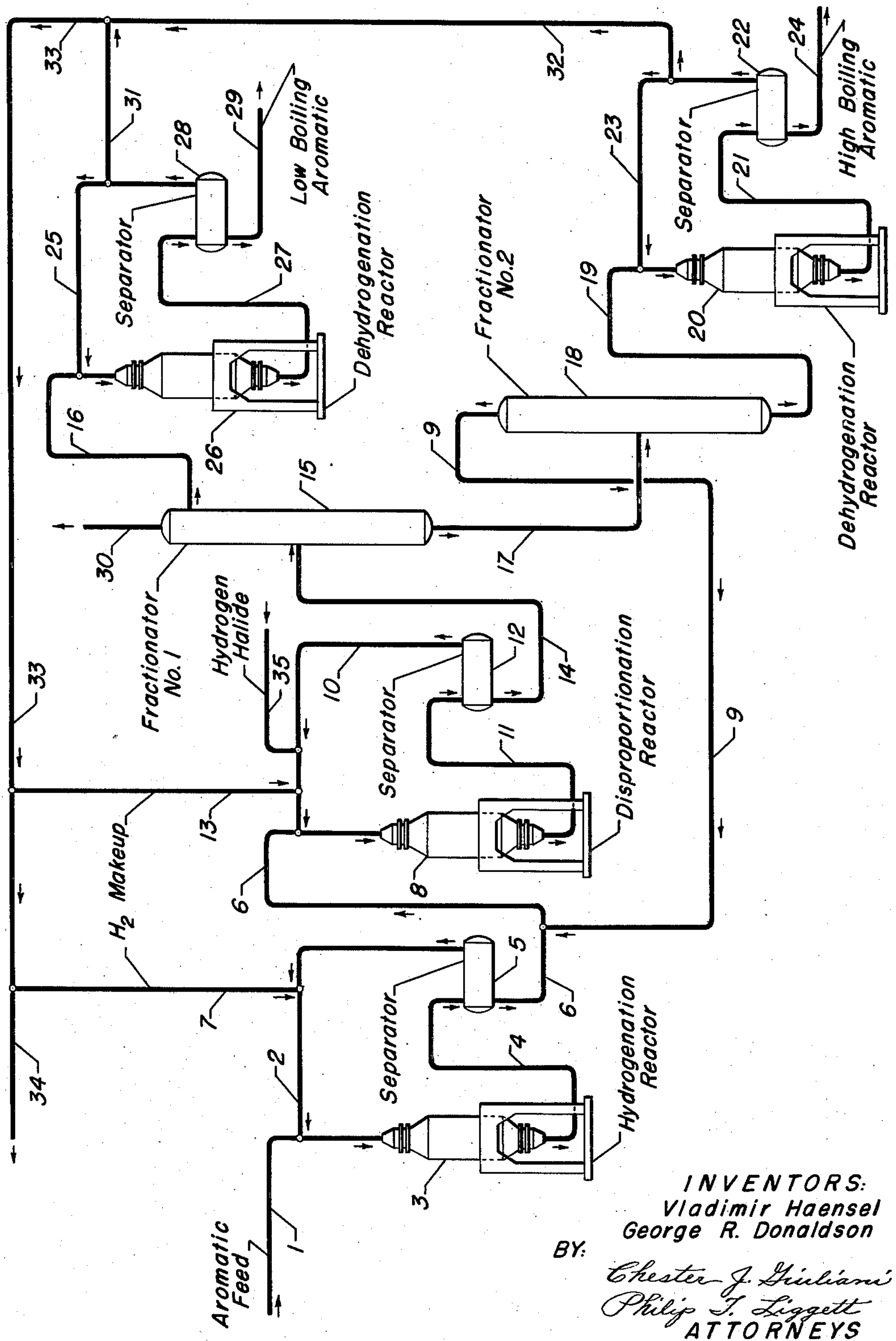
INVENTORS:
Vladimir Haensel
George R. Donaldson
BY: Chester J. Giuliani
Philip T. Liggett
ATTORNEYS United States Patent Office 2,966,529

Patented Dec. 27, 1960

2,966,529

PROCESS FOR THE PRODUCTION OF AROMATIC HYDROCARBONS

Vladimir Haensel, Hinsdale, and George R. Donaldson, Barrington, Ill., assignors, by mesne assignments, to Universal Oil Products Company, Des Plaines, Ill., a corporation of Delaware Filed Apr. 28, 1958, Ser. No. 731,185

4 Claims. (Cl. 260—668)

The present invention relates to the production of aromatic hydrocarbons and is particularly concerned with the disproportionation reactions of naphthenic compounds containing at least 7 carbon atoms per molecule effected in the presence of catalysts, such as the conversion of toluene to desirable high yields of benzene and xylene.

The use of aromatic hydrocarbons, particularly benzene and xylene, are increasing in use as products necessary in the relatively new petrochemical processing field. There is also an increasing demand for xylenes principally for use in the manufacture of benzene dicarboxylic acids as starting materials for important polymerization and condensation derivatives thereof including the new synthetic fibers known as "Dacron" and "Terylene." Benzene is also in demand for its use as an intermediate for the production of styrene as well as adipic acid used respectively in synthetic resins and synthetic fibers.

Various processes are presently employed in the production of xylene and benzene from toluene. These processes have a marked disadvantage in that the disproportionation of toluene to xylene and benzene is relatively small, such as a yield of about 17 mol percent benzene and 14 mol percent xylene. The object of this invention is to disclose a process wherein a relatively high yield of higher and lower boiling aromatic hydrocarbons are attained when aromatic hydrocarbons are subjected to the novel combination of steps provided by the present invention, hereinafter described.

According to the process of the present invention, aromatic hydrocarbons are contacted with a hydrogenation catalyst to form the corresponding naphthenic hydrocarbon after which said naphthenic hydrocarbon is contacted with a noble metal-containing catalyst in the presence of hydrogen and a hydrogen halide to perform the disproportionation of said naphthenic hydrocarbon. The product of the disproportionation reaction zone is passed to a separation zone from which the lower boiling naphthenic hydrocarbon is passed to a dehydrogenation reaction zone wherein said lower boiling naphthenic hydrocarbon is converted to the corresponding aromatic hydrocarbon. The higher boiling naphthenic hydrocarbon is withdrawn from the separation zone and is introduced into a separate dehydrogenation zone wherein said higher boiling naphthenic hydrocarbon is converted to a corresponding aromatic hydrocarbon.

In one embodiment this invention relates to a combination process for producing aromatic hydrocarbons boiling higher than and lower than an aromatic hydrocarbon charge to a hydrogenation zone containing a hydrogenation catalyst and therein hydrogenating at hydrogenation conditions said charge to the corresponding naphthenic hydrocarbon, passing said naphthenic hydrocarbon to a disproportionation zone and therein disproportionating said naphthenic hydrocarbon in the presence of a catalyst which comprises a refractory metal oxide, a platinum group metal, and a Friedel-Crafts metal halide in the presence of hydrogen and a hydrogen halide, separating resulting disproportionated naphthenic hydrocarbons into lower and higher boiling naphthenes, dehydrogenating the lower boiling and higher boiling naphthenes in separate dehydrogenation reaction zones in the presence of a suitable dehydrogenation catalyst at dehydrogenation conditions, separating and recovering desired aromatic hydrocarbons and returning the undisproportionated naphthenic hydrocarbons to the disproportionation reaction zone.

The separation zone through which the disproportionated and undisproportionated naphthenic hydrocarbons are passed following the disproportionation reaction zone may be any suitable means that is desired. For instance, the effluent from the disproportionation reaction zone may be subjected to fractional distillation and the naphthenic hydrocarbons would be thereby separated by difference in boiling point. The naphthenic hydrocarbons might also be separated by means of an extraction zone which would employ glycol as the medium for separating the naphthenic hydrocarbons from the other hydrocarbons which might be present in the disproportionation reaction effluent. Still another separation means which might be employed is one of the relatively new molecular sieve fractionation zones. The molecular sieves would permit the naphthenic hydrocarbons to pass through while retaining the paraffinic hydrocarbons which might be present in the disproportionation reaction zone effluent. Other suitable means which might be found desirable for the separation of the naphthenic hydrocarbons are considered to be covered by the broad scope of the present invention.

The hydrogenation portion of the combination process of the present invention may be effected at any suitable hydrogenating conditions in the presence of any suitable hydrogenating catalyst. Generally, the operating conditions and catalyst are determined by the degree of difficulty with which the particular aromatic hydrocarbon becomes hydrogenated. For example, benzene is readily converted to cyclohexane, and toluene to methylcyclohexane, at temperatures of from about 200° F. to about 800° F., at pressures within the range of from about 100 to about 2000 p.s.i.g. in the presence of a hydrogenating catalyst containing metals and metal oxides or sulfides of group VI and VIII and including the platinum family. Mixtures of two or more of the metals or compounds containing the same, especially metal oxides and sulfides may be employed such as nickel sulfide and tungsten sulfide.

Whatever metal component is employed as the hydrogenation catalyst, it is generally composited with a high surface area refractory inorganic oxide such as alumina, silica, boria, zirconia, thoria, titania, etc., and mixtures of two or more including alumina-boria, alumina-thoria, alumina-zirconia-boria, etc. It is understood that the refractory inorganic oxides hereinabove set forth are intended to be illustrative instead of limiting upon the method of the present invention. It is further understood that these refractory inorganic oxides may be manufactured by any suitable methods, including separate, successive, or coprecipitation methods of manufacturing, or they may be naturally occurring substances such as clays or earths which may be purified or activated with special treatment.

The catalyst used in the disproportionation reaction zone in the process of the present invention comprises a refractory oxide, a platinum group metal, and a metal halide of the Friedel-Crafts type. The refractory oxide is a solid and may be selected from various diverse oxides which are not necessarily equivalent as supports. Among suitable refractory oxides are various substances such as silica, various refractory metal oxides such as alumina, titanium dioxides, zirconium dioxide, chromia, zinc oxide, silica-alumina, chromia-alumina, alumina-boria, silica-zirconia, and various naturally occurring refractory oxides of various states of purity such as bauxite, clay which may or may not have been acid treated. Of the above mentioned rerfactory oxides, alumina is preferred, and particularly preferred is synthetically prepared gamma-alumina of a high degree of purity.

In the catalyst used in the disproportionation reaction zone in the process of the present invention the above mentioned refractory oxides have composited therewith a platinum group metal and a metal halide of the Friedel-Crafts type. By a platinum group metal is meant a noble metal, excluding silver and gold, and selected from platinum, palladium, ruthenium, rhodium, osmium, and iridium. These metals are not necessarily equivalent in activity in the catalyst utilized in the disproportionation reaction zone and of these metals platinum and palladium are preferred, and particularly platinum is preferred.

With the solid composite of refractory oxide and a platinum group metal for use as a disproportionation catalyst in the process of the present invention is associated a metal halide of the Friedel-Crafts type. Suitable metal halides of the Friedel-Crafts type include aluminum chloride, aluminum bromide, ferric chloride, ferric bromide, zinc chloride, beryllium chloride, titanium tetrachloride, zirconium chloride, stannic chloride, etc. Of these metal halides of the Friedel-Crafts type, the aluminum halides are preferred, and of the aluminum halides, aluminum chloride is particularly preferred. Furthermore, these metal halides are not necessarily equivalent when utilized in forming the catalyst utilized in the present process.

The catalyst which is used in the disproportionation reaction zone in the process of the present invention comprises a refractory oxide, a platinum group metal, and a metal halide of the Friedel-Crafts type in the presence of hydrogen and a hydrogen halide. The hydrogen halide which is employed in the process of the present invention comprises those hydrogen halides that are capable of reacting with the disproportionation catalyst at the disproportionation conditions in the reaction zone to a form that is suitable for activating the disproportionation catalyst. Such hydrogen halide compounds include hydrogen chloride, hydrogen fluoride, and hydrogen bromide. These compounds are not necessarily equivalent in their effect upon the disproportionation catalyst. A given quantity of one compound will increase the activity of the disproportionation reaction considerably more than a given amount of another compound. In addition, some of the compounds are completely absorbed or reacted with the catalyst during passage through the reaction zone while some other compounds which are employed only permit a small portion to be absorbed or reacted with the disproportionation catalyst.

In the operation of the process of the present invention, the hydrogen halide compound may be added in the required amount to the charge to the disproportionation reaction zone or it may be added to the reaction zone by means of the hydrogen recycle line. The hydrogen halide compound may be added continuously, although it may be more desirable to add it intermittently as required. The addition of the hydrogen halide to the disproportionation reaction zone is from about one to about 200 p.p.m. by weight percent based on the charge to the disproportionation reaction zone.

The dehydrogenation portion of the present invention may be effected at any suitable dehydrogenating conditions in the presence of any suitable dehydrogenating catalyst. Any suitable hydrogenating catalyst may be advantageously employed, such as those catalysts containing one or more metal components selected from group VIII of the periodic table. It is preferred that the catalyst comprises from about 0.1% to about 1% by weight of platinum and/or palladium, 0.375% to about 3.75% by weight of chloride and/or fluoride and alumina. Other catalytically active metal components may be employed in combination with the platinum or palladium, especially a small quantity of an alkaline earth metal component such as magnesium, barium, calcium, and strontium.

The catalytically active components of the dehydrogenation catalyst are generally composited with a refractory inorganic oxide, and the inorganic oxide employed is selected from those inorganic oxides having a marked tendency to promote the desired dehydrogenation reaction, rather than the undesired hydrocracking, ring opening, and polymerization reactions.

This invention will be further explained in describing the accompanying diagrammatic flow drawing which illustrates one specific embodiment of the invention but not with the intention of unduly limiting the same.

Referring to the drawing, a suitable charge stock such as toluene is introduced to the process through line 1 and directed into the hydrogenation zone 3 along with a hydrogen rich recycle stream 2. The hydrogenation zone 3 may comprise any suitable design in which the hydrogenating catalyst is disposed and in which the charge stock is satisfactorily contacted therewith under the desired operating conditions. The hydrogenation is usually effected at a temperature of from about 100° C. to about 300° C. and at a pressure of from about 100 to about 2000 p.s.i.g. The hydrogenation of toluene to the corresponding naphthene is effected at the above stated operating conditions in the presence of a suitable catalytic composite of nickel in the presence of hydrogen.

The hydrogenation products, that is, the $C_7$ naphthenic hydrocarbons are withdrawn from reaction zone 3 by means of line 4 and passed to a separation zone 5 wherein a separation of the $C_7$ naphthenic hydrocarbons from hydrogen is effected. A hydrogen rich gas stream is passed overhead from separation zone 5 by means of line 2 and recycled to the hydrogenation reaction zone 3 along with a hydrogen makeup stream 7, the source of which will be hereinafter described. The $C_7$ naphthenic hydrocarbons are withdrawn from the bottom of separation zone 5 by means of line 6 and joined with a recycle stream 9 containing ethylcyclopentane, dimethylcyclopentane, and methylcyclohexane, the source of this stream will be hereinafter described. The combined stream of $C_7$ naphthenic hydrocarbons in line 6 and recycle stream 9 are joined with a hydrogen rich recycle gas stream 10 and passed to a disproportionation reaction zone 8.

In order to effect added activation of the disproportionation catalyst in reaction zone 8, hydrogen chloride is passed by means of line 35 to recycle line 10 which as has been hereinabove stated, passes to reaction zone 8. The portion of hydrogen chloride not used in the reaction zone 8 is withdrawn from the process by means of line 30 as will be hereinafter described.

The disproportionation of the $C_7$ naphthenic hydrocarbons to $C_6$ naphthenic hydrocarbons and $C_8$ naphthenic hydrocarbons is effected in reaction zone 8 under the desired operating conditions and in the presence of a disproportionation catalyst. Disproportionation is usually effected at a temperature of from about 150° C. to about 300° C. and at a pressure of from about 100 p.s.i.g. to about 900 p.s.i.g., a liquid hourly space velocity of from about 0.1 to about 5, and a hydrogen to charge ratio of from about 1 to about 5. The disproportionation of the $C_7$ naphthenic hydrocarbon is effected in the presence of a catalytic composite of platinum, alumina, and aluminum chloride and in the presence of hydrogen and hydrogen chloride.

The disproportionation reaction zone products are withdrawn from reaction zone 8 by means of line 11 and passed to separation zone 12 wherein a separation of hydrogen from the disproportionated hydrocarbons is effected. A hydrogen rich recycle gas stream is withdrawn from the top of separation zone 12 by means of line 10 and joined with a hydrogen rich makeup stream 13, the source of which will be hereinafter described, and passed to reaction zone 8 as hereinbefore described. The hydrocarbon products of the disproportionation reaction are withdrawn from the bottom of separation zone 12 by means of line 14 and passed to fractionation zone 15. The upper portion of zone 15 serves as a conventional debutanizer column and thus the low boiling gaseous hydrocarbons along with the unreacted hydrogen chloride, introduced by means of line 35, are passed overhead by means of line 30. The lower boiling $C_6$ naphthenic hydrocarbons are withdrawn from the upper portion of fractionation zone 15 by means of line 16 and passed to a dehydrogenation reaction zone 26.

The dehydrogenation of $C_6$ naphthenic hydrocarbons is usually effected at a temperature of from about 350° C. to about 500° C. and at a pressure of from about 100 p.s.i.g. to about 1000 p.s.i.g. and in the presence of hydrogen and a catalytic composite which comprises platinum, alumina, and combined halogen. The $C_6$ naphthenic hydrocarbons in line 16 are combined with a hydrogen rich recycle gas stream 25 and passed to dehydrogenation reaction zone 26 as hereinabove described. The dehydrogenation reaction zone product is withdrawn from reaction zone 26 by means of line 27 and passed through a separation zone 28 wherein hydrogen is separated from the aromatic product. The hydrogen rich recycle gas stream is passed overhead from reaction zone 28 by means of line 25 and returned to dehydrogenation reaction zone 26 as hereinbefore described. The dehydrogenation product which in this case is benzene is withdrawn from the bottom of separation zone 28 by means of line 29.

The excess hydrogen recycle gas which is produced in reaction zone 26 is withdrawn from line 25 by means of line 31. The recycle gas in line 31 is combined with excess hydrogen recycle gas in line 32, the source of which is reaction zone 20 which will be hereinafter described. The combined streams of excess hydrogen recycle gas are passed by means of line 33 to disproportionation reaction zone 8 and the hydrogenation reaction zone 3. The quantities of makeup hydrogen gas required for the reaction zone 8 and reaction zone 3 are withdrawn from line 33 by means of line 13 and line 7, respectively. Any excess hydrogen gas not required in the combination process of the present invention is withdrawn from the process by means of line 34.

The higher boiling $C_7$ and $C_8$ naphthenic hydrocarbons are withdrawn from the bottom of fractionation zone 15 by means of line 17. The bottoms product from fractionation zone 15 is now directed by means of line 17 to fractionation zone 18. Fractionation zone 18 effects the separation of $C_7$ and $C_8$ naphthenic hydrocarbons by passing the lower boiling $C_7$ naphthenic hydrocarbons overhead from fractionation zone 18 by means of line 9. The $C_7$ naphthenic hydrocarbons which, as has been previously mentioned, are ethylcyclopentane, dimethylcyclopentane, and methylcyclohexane are returned to the disproportionation reaction zone 8 for further disproportionation to $C_6$ and $C_8$ naphthenic hydrocarbons.

The bottoms product from fractionation zone 18 is withdrawn by means of line 19 and said product contains the following $C_8$ naphthenic hydrocarbons: dimethylcyclohexane, trimethylcyclopentane and methylethylcyclopentane. The $C_8$ naphthenic hydrocarbons are passed to dehydrogenation reaction zone 20 which is operated at about the same conditions as has been hereinbefore stated for dehydrogenation reaction zone 26. The $C_8$ naphthenic hydrocarbons in line 19 are joined with a hydrogen rich recycle gas stream 23 and directed to dehydrogenation reaction zone 20. The dehydrogenation reaction zone product is withdrawn from the bottom of reaction zone 20 by means of line 21 and passed to a separation zone 22 wherein a separation of the aromatic product from hydrogen is effected. A hydrogen rich recycle gas stream is passed overhead from separation zone 28 by means of line 23 and returned to dehydrogenation reaction zone 20 as has been hereinbefore described. The aromatic hydrocarbon product which in this case is xylene is withdrawn from the bottom of separation zone 22 by means of line 24.

The following example is introduced to further illustrate one specific operation of this process, but not with the intention of unduly limiting the same.

*Example I*

In this example 75 cc. of toluene were subjected to hydrogenation in the presence of a nickel catalyst at a temperature of 200° C., and a pressure of 800 p.s.i.g. to produce the $C_7$ naphthenic hydrocarbons. The product of the hydrogenation reaction zone is combined with 75 cc. of a recyle stream containing $C_7$ naphthenic hydrocarbon to form a combined feed to the disproportionation reaction zone of 150 cc. of $C_7$ naphthenic hydrocarbons. The disproportionation of the $C_7$ naphthenic hydrocarbons was effected in the presence of a catalytic composite of platinum, alumina, and aluminum chloride at a temperature of 150° C., a pressure of 500 p.s.i.g., a liquid hourly space velocity of 2 and a hydrogen to charge ratio of 2.0. The product of the disproportionation reaction zone was subjected to a conventional debutanizer column and further fractionation to separate $C_6$ naphthenic hydrocarbons, $C_7$ naphthenic hydrocarbons and $C_8$ naphthenic hydrocarbons. A fraction containing $C_4$ and lower boiling naphthenic hydrocarbons was found to be 3% by volume of the combined feed. The $C_6$ naphthenic hydrocarbons which were obtained by selective fractionation were found to be about 20% by volume of the combined feed while the $C_8$ naphthenic hydrocarbons were found to be about 25% by volume of the combined feed. The remaining materials obtained by selective fractionation were $C_7$ naphthenic hydrocarbons which were 50% by volume of the combined feed and this material was returned to the disproportionation reaction zone recycle for further conversion to $C_6$ naphthenic hydrocarbons and $C_8$ naphthenic hydrocarbons. Both the $C_6$ naphthenic hydrocarbons and the $C_8$ naphthenic hydrocarbons obtained as a product in this example were subjected to independent dehydrogenation zones which contained alumina, platinum, and combined halogen catalyst at a temperature of 500° C. and a pressure of 300 p.s.i.g. Therefore, the $C_6$ naphthenic hydrocarbons were dehydrogenated to benzene while the $C_8$ naphthenic hydrocarbons were dehydrogenated to xylene.

We claim as our invention:

1. A process for the conversion of an aromatic hydrocarbon into higher boiling and lower boiling aromatic hydrocarbons which comprises hydrogenating the first-mentioned aromatic hydrocarbon to the corresponding naphthenic hydrocarbon, disproportionating said naphthenic hydrocarbon in the presence of a refractory metal oxide, a platinum group metal and a Friedel-Crafts metal halide and in the presence of hydrogen and a hydrogen halide to form a naphthene of more carbon atoms and a naphthene of less carbon atoms than said naphthenic hydrocarbon, separating the naphthenes thus formed from each other and separately dehydrogenating them to aromatic hydrocarbons, and recovering the last-mentioned aromatic hydrocarbons.

2. The process of claim 1 further characterized in that said catalytic composite comprises alumina, platinum and aluminum chloride.

3. A process for producing benzene and xylene from toluene which comprises hydrogenating the toluene to the corresponding $C_7$ naphthene, disproportionating said $C_7$ naphthene in the presence of a catalytic composite of a refractory metal oxide, a platinum group metal, and a Friedel-Crafts metal halide and in the presence of hydrogen and hydrogen halide to form a $C_6$ naphthene and a $C_8$ naphthene, separating said $C_6$ and $C_8$ naphthenes from each other and separately dehydrogenating them to benzene and xylene, respectively, and recovering the benzene and xylene thus produced.

4. The process of claim 3 further characterized in that said catalytic composite comprises alumina, platinum and aluminum chloride.

References Cited in the file of this patent

UNITED STATES PATENTS

| | | |
|---|---|---|
| 2,739,993 | Schneider et al. | Mar. 27, 1956 |
| 2,781,324 | Haensel | Feb. 12, 1957 |
| 2,784,241 | Holm | Mar. 5, 1957 |
| 2,834,821 | Bergsteinsson | May 13, 1958 |
| 2,885,451 | Linn | May 5, 1959 |